United States Patent

Sarai

[15] 3,643,690
[45] Feb. 22, 1972

[54] VENTED FUEL TANK
[72] Inventor: Hiroshi Sarai, Toyota, Japan
[73] Assignee: Toyota Jidosha Kogyo Kabushiki Kaisha, Toyota, Japan
[22] Filed: Sept. 10, 1970
[21] Appl. No.: 70,695

[30] Foreign Application Priority Data

Sept. 13, 1969 Japan..................................44/87497

[52] U.S. Cl...................................137/587, 220/44, 220/86
[51] Int. Cl.............................................................F16k 45/00
[58] Field of Search.............220/44, 86; 137/583, 587, 588, 137/589

[56] References Cited

UNITED STATES PATENTS

2,429,280 10/1947 Scully et al..........................137/587 X
3,187,935 6/1965 Lense.......................................220/86

Primary Examiner—Henry T. Klinksiek
Attorney—McGlew and Toren

[57] ABSTRACT

A fuel tank comprising a fuel tank body, a first vent pipe, one end of which extends for a desired length into the tank body from an upper faceplate while its other end is in communication with the upper part of a fuel filling pipe which is connected at its lower end to the fuel tank body. For forming an air chamber having a desired capacity in the upper part of the tank body, the lower end of the fuel filling pipe opens into the inside of fuel tank body at a position below the lower opened end of the first vent pipe, a second vent pipe is provided with its lower end opening into the upper part of the fuel filling pipe and with its upper end opening into the atmosphere, and a third vent pipe communicating between the second vent pipe and the air chamber in the fuel tank body through a check valve. By means of the check valve the third vent pipe is opened into the atmosphere through the second vent pipe only when the fuel overflows out of the fuel filling pipe.

4 Claims, 5 Drawing Figures

INVENTOR.
HIROSHI SARAI
BY McGraw and Torem
ATTORNEYS

VENTED FUEL TANK

This invention relates to fuel tanks, and has its object to prevent the fuel from gushing out of a tank through a vent pipe in the event that for example, a temperature around the fuel tank installed on an automobile goes up, whereby the fuel in said tank brings about heat expansion; to prevent the atmosphere from contamination caused by the above; to prevent the automobile from occurrence of fire due to the ignition of fuel; and to maintain economical use of fuel.

In a previous type of fuel tank, as shown in FIG. 1, the large capacity of a gas and liquid separating case 18 provided with a space sufficient for receiving fuels heat expanded from a fuel tank 10 and a fuel filling pipe 21 has to be disposed independently of and above the fuel filling pipe 21, which, in this instance, is impossible to make said gas and liquid separating case 18 and fuel tank 10 compact. Especially in automobiles of the type in which they are mounted in a baggage space of a relatively small type of passenger car, it has been impossible to locate a gas and liquid separating case 18 having a large capacity due to the limit of height of the baggage space.

However, this invention makes it possible to prevent the fuel from gushing out of a tank through a vent pipe, to prevent the atmosphere from contamination and the occurrence of fire due to the ignition of fuel caused thereby, and to maintain economical use of fuel. According to this invention, the fuel can be prevented from gushing out of a fuel tank by arranging a check valve having a small body capacity at a position higher than that of the fuel filling pipe. Further, according to the invention, an air chamber is formed at the upper inside part of the fuel tank to enable it to replace the previously used gas and liquid separating case, it is therefore not necessary to provide with the gas and liquid separating case of previous type. The cost of manufacturing a fuel tank as a whole becomes cheaper and the space can also be used widely. Further, the center of gravity for the whole body of machinery including a fuel tank can be lowered.

Other objects and characteristics of the invention will be apparent from the following description with reference to the accompanying drawings in which.

The embodiment of this invention, in which case the invention is applied to a fuel tank for an automobile, will be described hereinafter with reference to FIGS. 2 to 5.

Figure 1:
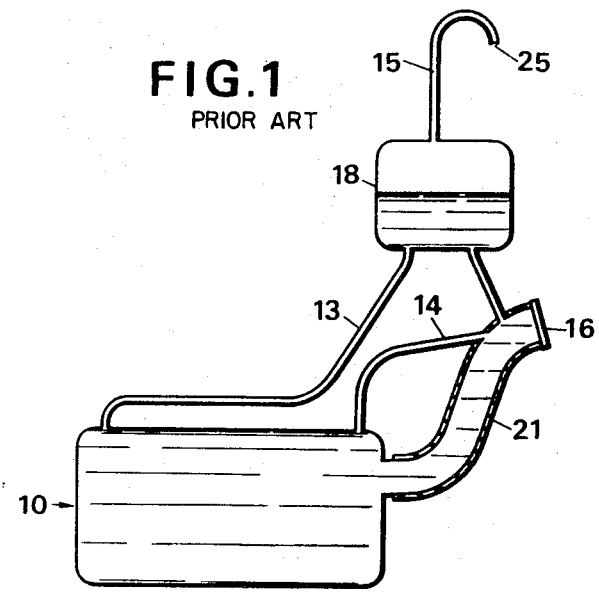
FIG. 1 is a view showing a fuel tank hitherto used for preventing fuel from gushing out.
Figure 2:
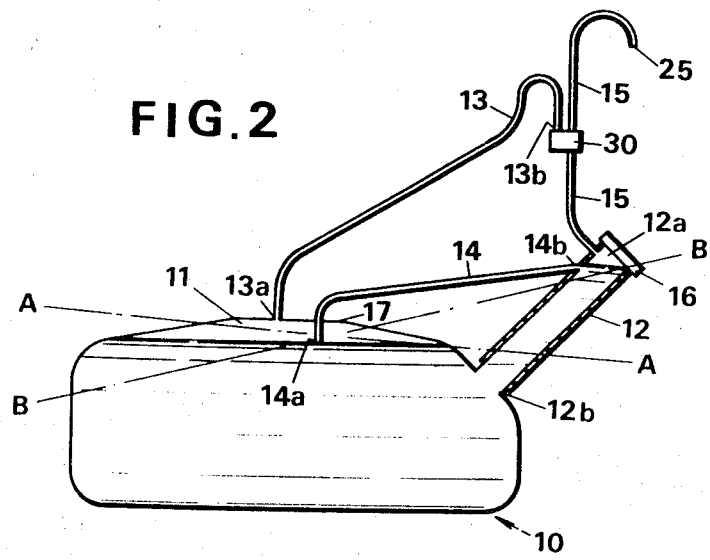
FIG. 2 is a view illustrating one embodiment of a fuel tank according to this invention.

In order to form an air chamber 11 having a desired capacity in the upper inside part of a fuel tank 10, one end $14_a$ of a vent pipe 14 is extended to be hung to a desired length inside the tank 10 from an upper faceplate 17 of said tank 10, and the other end $14_b$ is in communication with the upper part $12_a$ of a fuel filling pipe 12, as shown in FIG. 2. The bottom part $12_b$ of the fuel filling pipe 12 opens into the fuel tank 10, at a position much lower than that of the end $14_a$ of said vent pipe 14, which end position extends to the desired length inside the fuel tank 10 from an upper faceplate 17 thereof, as mentioned above. (Unless the bottom part $12_b$ of said fuel filling pipe 12 is situated much lower than the end $14_a$ of the vent pipe 14 and opens into the fuel tank 10, the air chamber 11 with a desired capacity can not be formed.) One end of a vent pipe 15 is in communication with the upper part $12_a$ of the fuel filling pipe 12, and the other end 25 is open to the atmosphere at a position higher than the upper part $12_a$ of the fuel filling pipe 12. A valve 30 is provided between the ends of said vent pipe 15, positioned higher than the upper part $12_a$ of the fuel filling pipe 12 and a vent pipe 13 branches therefrom. The upper end $13_b$ of the vent pipe 13 is inserted in the valve 30 and the other lower end $13_a$ of said vent pipe 13 is connected to the upper faceplate 17 of the fuel tank 10, so as to communicate with the air chamber 11 in the upper inside part inside the tank 10. The position of said vent pipe 13, opened into the inside of the air chamber 11, has to be so positioned that when a machine under the normal conditions of use, for example, the automobile body is inclined, that is, even when a fuel level (at the time of full fuel) in the fuel tank inclines as shown by single dot and dash lines A—A and B—B in FIG. 2, the end $13_a$ opened into the inside of the air chamber 11 of the vent pipe 13 is not to be blocked up.

As shown in FIG. 2, however, in case that the vent pipe 13 is constructed by one piece in number, the fuel tank has a tendency to become higher in its height in comparison with its bottom area, which also causes the center of gravity of the fuel tank 10 to heighten. This difficulty is resolved by employing another embodiment shown in FIG. 3, wherein the fuel tank 10 is flattened to lower its center of gravity, and at a portion $13_c$ intermediate its ends the vent pipe 13 is branched into two vent pipes 31 and 32, having ends $31_a$ and $32_a$ which open into both left and right sides of the air chamber 11, respectively, within the tank 10. At a junction (refer to FIGS. 2 and 3) of the vent pipe 15 and the vent pipe 13, the check valve 30 is provided in order that only when the fuel over-flows out of the fuel filling pipe 12, air in the air chamber 11 is to be communicated with the atmosphere through the pipes 13 and 15, whereas under normal conditions, air in the said air chamber 11 is not to be communicated with the vent pipe 15. This check valve 30, which is, for example, as shown in detail in FIGS. 4 and 5, comprises a valve body 35, a float 36 formed by a hard sponge covered with resin film positioned within said valve body 35 and having a specific gravity smaller than that of the fuel, and a needle valve $35_b$, which acts to place the vent pipes 13 and 15 in communication by opening a flowing port $35_a$ of the valve body 35 in a state as shown in FIG. 5 where it is pushed upwards due to the rising of said float 36 when the fuel in the fuel filling pipe 12 overflows into the valve body 35 through the vent pipe 15 mounted on a valve cover 37, and which acts to block up said flowing port $35_a$ in the state shown in FIG. 4 by lowering down the float due to its own weight when the fuel does not exist in the valve body 35. 16 in FIGS. 2 and 3 designates a seal cap by which an open part of the fuel filling pipe 12 can be sealed liquidtightly.

Figure 3:
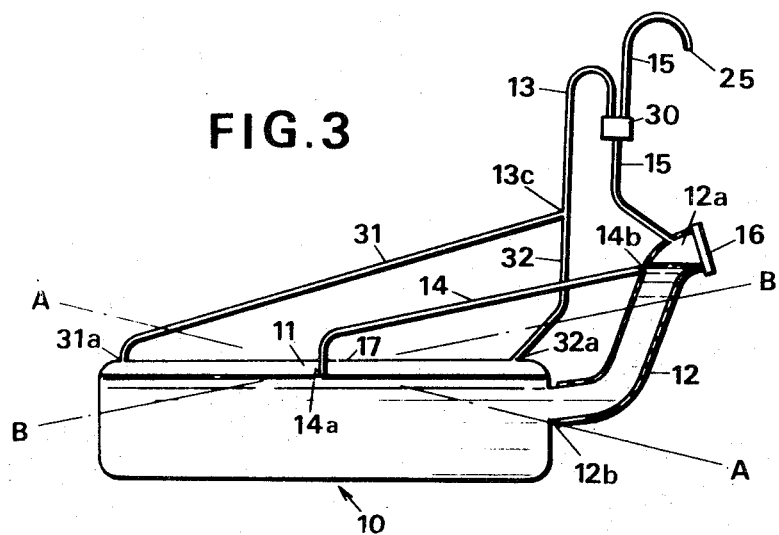
FIG. 3 is a view illustrating another embodiment of a fuel tank according to this invention.
Figure 4:
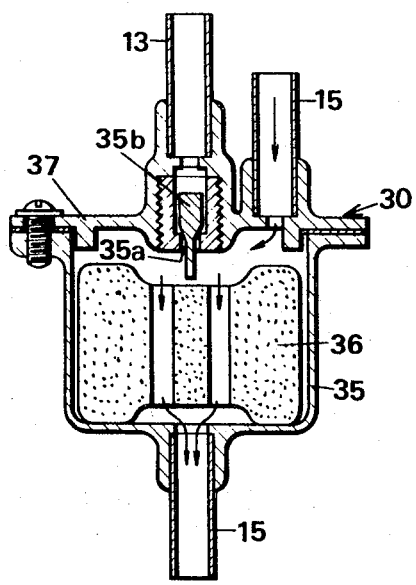
FIG. 4 is an enlarged longitudinal sectional view of a check valve illustrated in FIGS. 2 and 3.
Figure 5:
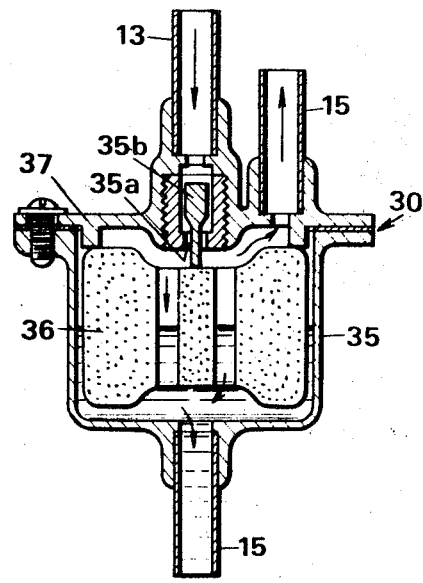
FIG. 5 is a view showing an operational state of the check valve shown in FIG. 4.

According to the construction of the above described embodiments of this invention, with the exception of such cases where the fuel in the fuel tank 10 is being used, or the fuel overflows into the valve body through the vent pipe 15 from the fuel filling pipe 12, the check valve 30 is in the state shown in FIG. 4, that is, the float 36 and needle valve $35_b$ are in the lower position and thereby the flowing port $35_a$ is blocked up by a needle valve $35_b$, and the air chamber 11 having a desired capacity is formed in the upper inside portion of fuel tank 10 even when the tank 10 is full of fuel (a state shown in FIGS. 2 and 3) to be filled from the aforesaid state to a position that one end $14_a$ of the vent pipe 14 is blocked up due to the rising of fuel level in the tank 10. Even if fuel is filled up to the upper part $12_a$ of the fuel filling pipe 12 as shown in FIGS. 2 and 3, the vent pipe 15 is in communication with the atmosphere at all times through the check valve 30, effecting a breathing operation. Even if the fuel in the tank 10 is heat expanded due to a rise in the temperature around the fuel tank 10, the fuel level hardly goes up into the air chamber 11 and the fuel goes up through the vent pipe 15, which opens into the atmosphere from the upper part $12_a$ of the filling pipe 12, and overflows into the valve body 35 so as to move the float 36 upwards. When the flowing port $35_a$ is opened in the state shown in FIG. 5 by pushing up the needle valve $35_b$, the air in the air chamber 11 in the upper inside part of the fuel tank 10 is communicated with the atmosphere passing through the vent pipes 13 and 15. At this time, a fuel equivalent in volume to that of air escaped in communication with the atmosphere, enters into the air chamber 11, and the fuel level in the fuel tank 10 goes up only by the volume of fuel which entered into the said air chamber 11. Whereby the fuel overflowing into the valve body 35 passes downwardly through the vent pipe 15 only by the volume of fuel entered into the air chamber 11, as a result thereof, both float 36 and needle valve $35_b$ in the valve body 35 also drop downwards so that the flowing port $35_a$ is blocked up and again the air chamber 11 is cut off from the atmosphere.

By the repetition of the above operation, the fuel overflowing into the valve body 35 does not gush out of the opened end into the atmosphere, moving upwards in the vent pipe 15 situated above the check valve 30. Further, even if the flowing port $35_a$ is opened momentarily, as will be seen in an automobile, due to the vertical movement of the needle valve $35_b$ caused by an extreme shock during its running, the volume in the air chamber 11 reduces and the fuel level in the fuel tank 10 goes up only by the volume equal to the reduced amount of said air, and the fuel level in the fuel filling pipe 12 lowers only by the reduced volume of air in the air chamber 11 so as to secure a space having a volume to the extent of fuel expansion inside the fuel filling pipe 12, thus the fuel does not gush out of the opened end into the atmosphere moving further upwards within the vent pipe 15. Further, in the tank 10 shown in FIG. 3, even if the fuel level in said tank 10 is inclined as shown by single dot and dash line A—A or line B—B, either vent pipe 31 or vent pipe 32 is opened into the air chamber 11 at all times so as to maintain a constant operation that the fuel can be prevented from gushing out of the tank into the atmosphere. Further, as the occasion requires the end 25 to be opened into the atmosphere of the vent pipe 15 is opened into a gas storage case, in which activated carbon is used for absorbing vaporized gas of stored fuel, whereby the vaporized gas of fuel, which is diffused into the atmosphere out of the fuel tank 10 through the vent pipe 15, can be completely prevented it from its passage.

It is to be understood that the form of the invention herewith shown and described is to be taken as preferred embodiments. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

What I claim is:

1. A fuel tank comprising a fuel tank body including a faceplate located in the upper part of said fuel tank body, a fuel filling pipe having its first end opening into said fuel tank body below said upper faceplate and its second end being located upwardly from the first end thereof, a first vent pipe having one end extending through said upper faceplate into the interior of said fuel tank body at a position spaced above the first end of said fuel filling pipe opening into said fuel tank body for forming an air chamber therein having a desired capacity in the upper part of said tank body, the other end of said first vent pipe opening into said fuel filling pipe adjacent the second end thereof, an upwardly extending second vent pipe connected at its lower end into said fuel filling pipe adjacent its second end and its upper end being opened to the atmosphere, a check valve positioned within said second vent pipe intermediate the ends thereof, and a third vent pipe connected at its upper end to said check valve and at its lower end to said upper face plate communicating with the interior of said fuel tank body at a position above the one end of said first vent pipe, means displaceable within said check valve between a first position for blocking flow therethrough between said third vent pipe and said second vent pipe and a second position for admitting flow from said third vent pipe to said second vent pipe for discharge to the atmosphere when fuel flow overflows out of said fuel filling pipe through said second vent pipe into said check valve.

2. A fuel tank, as set forth in claim 1, characterized in that the lower end of said third vent pipe is branched forming a pair of vent pipe sections each connected at its end spaced from the branched connection to said upper faceplate for communicating with the interior of the upper part of said fuel tank body at spaced locations on opposite sides of said fuel tank.

3. A fuel tank, as set forth in claim 1, characterized in that said check valve comprises a valve body, said means displaceable within said check valve comprising a float positioned within said valve body and having a specific gravity smaller than that of the fuel, and a needle valve positioned within said valve body in the path of the connection of said upper end of said third vent pipe to said valve body, said float being arranged for displacing said needle valve from a first position blocking flow through said third vent pipe into said valve body to a second position for admitting flow through said third vent pipe into said valve body and then into said second vent pipe.

4. A fuel tank, as set forth in claim 1, characterized in that a gas storage case containing activated carbon is positioned at the upper end of said second vent pipe for absorbing vaporized fuel issuing through said second vent pipe.

* * * * *